US012254748B2

(12) United States Patent
Satterlie et al.

(10) Patent No.: US 12,254,748 B2
(45) Date of Patent: Mar. 18, 2025

(54) GAMING MACHINE HAVING SEPARATED FEATURE GAMES

(71) Applicant: Aristocrat Technologies Australia Pty Limited, North Ryde (AU)

(72) Inventors: Eric Satterlie, Las Vegas, NV (US); Christmas Uberuaga, Reno, NV (US)

(73) Assignee: Aristocrat Technologies Australia Pty Limited, Las Vegas, NV (US)

( * ) Notice: Subject to any disclaimer, the term of this patent is extended or adjusted under 35 U.S.C. 154(b) by 0 days.

(21) Appl. No.: 18/080,226

(22) Filed: Dec. 13, 2022

(65) Prior Publication Data

US 2023/0116350 A1 Apr. 13, 2023

Related U.S. Application Data

(63) Continuation of application No. 17/109,700, filed on Dec. 2, 2020, now Pat. No. 11,532,210, which is a continuation of application No. 16/293,050, filed on Mar. 5, 2019, now Pat. No. 10,867,480, which is a continuation of application No. 15/683,372, filed on Aug. 22, 2017, now Pat. No. 10,262,501.

(51) Int. Cl.
*G07F 17/34* (2006.01)
*G07F 17/32* (2006.01)

(52) U.S. Cl.
CPC ...... *G07F 17/3267* (2013.01); *G07F 17/3213* (2013.01); *G07F 17/3216* (2013.01); *G07F 17/323* (2013.01); *G07F 17/3255* (2013.01); *G07F 17/3258* (2013.01); *G07F 17/34* (2013.01)

(58) Field of Classification Search
CPC ............. G07F 17/3211; G07F 17/3213; G07F 17/3267; G07F 17/34
See application file for complete search history.

(56) References Cited

U.S. PATENT DOCUMENTS 5,788,573 A 8/1998 Baerlocher
5,823,873 A * 10/1998 Moody ..................... A63F 1/00 463/13
5,976,016 A * 11/1999 Moody ................... G07F 17/32 463/20
6,098,985 A * 8/2000 Moody ................... G07F 17/32 463/13

(Continued)

FOREIGN PATENT DOCUMENTS

AU 2018204241 3/2019
WO WO-0020082 A1 * 4/2000 ......... G07F 17/3265

(Continued)

OTHER PUBLICATIONS

Australian Examination Report No. 1 for App. No. AU2019275670, dated Jan. 6, 2021, 4 pages.

(Continued)

*Primary Examiner* — Steven J Hylinski
(74) *Attorney, Agent, or Firm* — Greenberg Traurig, LLP

(57) ABSTRACT

A gaming machine having three displays of (1) five mechanical reels, (2) five video reels and (3) a single multi-slice wheel. Gaming interaction between the three displays provides a base game on the mechanical reels from which (1) a first spinning-reel-type bonus game is triggered and (2) a second wheel-type bonus game is triggered.

15 Claims, 13 Drawing Sheets

(56) References Cited

U.S. PATENT DOCUMENTS

| | | | | |
|---|---|---|---|---|
| 6,811,486 | B1 * | 11/2004 | Luciano, Jr. | G07F 17/3239 463/19 |
| 7,070,501 | B2 | 7/2006 | Cormack | |
| 7,819,741 | B1 | 10/2010 | Luciano | |
| 8,360,851 | B2 | 1/2013 | Aoki | |
| 9,311,787 | B2 * | 4/2016 | Meyer | G07F 17/3211 |
| 9,424,720 | B2 | 8/2016 | Suda | |
| 9,928,691 | B2 | 3/2018 | Olive | |
| 2003/0027628 | A1 | 2/2003 | Luciano | |
| 2003/0045343 | A1 * | 3/2003 | Luccesi | G07F 17/32 463/20 |
| 2003/0216165 | A1 | 11/2003 | Singer | |
| 2004/0048649 | A1 | 3/2004 | Peterson | |
| 2004/0137982 | A1 | 7/2004 | Cuddy | |
| 2005/0070353 | A1 | 3/2005 | Webb | |
| 2006/0189369 | A1 | 8/2006 | Taylor | |
| 2006/0211467 | A1 * | 9/2006 | Thomas | G07F 17/3211 463/16 |
| 2006/0264254 | A1 * | 11/2006 | Aoki | G07F 17/32 463/20 |
| 2007/0060248 | A1 | 3/2007 | Rodgers | |
| 2007/0129135 | A1 | 6/2007 | Marks | |
| 2009/0054129 | A1 | 2/2009 | Yoshimura | |
| 2009/0239634 | A1 | 9/2009 | Nguyen | |
| 2010/0075737 | A1 | 3/2010 | Bluemel | |
| 2010/0210343 | A1 | 8/2010 | Englman | |
| 2010/0234092 | A1 | 9/2010 | Gomez | |
| 2012/0122545 | A1 | 5/2012 | Watkins | |
| 2012/0178517 | A1 | 7/2012 | Montenegro | |
| 2013/0237306 | A1 | 9/2013 | Meyer | |
| 2013/0331168 | A1 | 12/2013 | Street | |
| 2014/0031100 | A1 * | 1/2014 | Gomez | G07F 17/34 463/20 |
| 2014/0080564 | A1 | 3/2014 | Acres | |
| 2014/0274292 | A1 | 9/2014 | Suda | |
| 2014/0323198 | A1 | 10/2014 | Tuck | |
| 2015/0310699 | A1 | 10/2015 | Meyer | |
| 2015/0363999 | A1 * | 12/2015 | Little | G07F 17/3213 463/20 |
| 2016/0042597 | A1 | 2/2016 | Olive | |
| 2016/0093172 | A1 | 3/2016 | Kitamura | |
| 2016/0253873 | A1 | 9/2016 | Olive | |
| 2017/0032609 | A1 | 2/2017 | Inamura | |
| 2017/0148274 | A1 | 5/2017 | Olive | |
| 2017/0154498 | A1 | 6/2017 | Olive | |
| 2018/0075708 | A1 | 3/2018 | San | |
| 2018/0268655 | A1 | 9/2018 | Olive | |
| 2019/0066445 | A1 | 2/2019 | Satterlie | |
| 2020/0111312 | A1 | 4/2020 | Olive | |

FOREIGN PATENT DOCUMENTS

| | | | | |
|---|---|---|---|---|
| WO | WO-2008027545 | A2 * | 3/2008 | G07F 17/32 |
| WO | WO-2009005702 | A1 * | 1/2009 | G07F 17/3265 |
| WO | WO-2009005703 | A1 * | 1/2009 | G07F 17/34 |

OTHER PUBLICATIONS

Office Action dated May 8, 2020 for U.S. Appl. No. 16/293,050 (pp. 1-9).

Notice of Allowance dated Aug. 26, 2020 for U.S. Appl. No. 16/293,050 (pp. 1-7).

Office Action (Non-Final Rejection) dated Jan. 27, 2022 for U.S. Appl. No. 17/109,700 (pp. 1-8).

Office Action (Notice of Allowance and Fees Due (PTOL-85)) dated Sep. 7, 2022 for U.S. Appl. No. 17/109,700 (pp. 1-10).

Australian Examination Report No. 1 issued in App. No. AU2022200051, dated Feb. 22, 2023, 3 pages.

* cited by examiner

GAMING MACHINE HAVING SEPARATED FEATURE GAMES

RELATED APPLICATIONS

This application is a continuation of U.S. patent application Ser. No. 17/109,700, filed Dec. 2, 2020, which is a continuation of U.S. patent application Ser. No. 16/293,050, filed Mar. 5, 2019, which is a continuation of U.S. patent application Ser. No. 15/683,372, filed Aug. 22, 2017, the disclosures of which are hereby incorporated by reference herein in their entirety.

BACKGROUND

The present invention relates to a gaming system and method of gaming, and more particularly to a base game, a bonus game and a wheel game interacting within a gaming system.

Player operated gaming systems, such as coin-operated slot machines, are widely used in many countries. Such gaming systems may comprise a plurality of rotatable reels having game symbols at their edges. After stopping the rotating reels, a combination of game symbols is visible. If the combination of game symbols includes a winning combination of symbols, the player is awarded a prize.

The gaming system may comprise a display area in which for example 3 player symbols of each reel are visible when the reel is stopped. The gaming system may comprise 5 such reels and consequently the display area comprises 15 display portions at which game symbols are visible when the reels are stopped.

The player typically is given the opportunity to purchase win lines, which usually comprise adjacent display positions within the display area and along which a winning combination of game symbols may be displayed.

In such gaming systems, bonus games allow a player to win an additional award. Typically, a feature game such as a bonus game or wheel game is triggered based on symbols spun up in the base game. While such gaming systems provide players with enjoyment, a need exists for new gaming systems having bonus games which not only maintain but increase player enjoyment.

These and other objects of the present invention are achieved in the following described embodiment of an invention.

BRIEF SUMMARY

The gaming system of the present invention includes an embodiment having three displays of (1) five mechanical reels, (2) five video reels and (3) a single multi-slice wheel. Interaction between the three displays provides a base game which triggers a first spinning-reel-type bonus game and which also triggers a second wheel-type bonus game.

In another embodiment, a reel base game and a reel bonus game interact. Upon a bonus trigger, symbols from the base game populate onto a bonus game display.

Further, special symbols which populate the bonus game display may carry prize identifiers for bonus game awards.

The system provides player anticipation and enjoyment.

These and other advantages, aspects and novel features of the disclosure, as well as details of an illustrated embodiment thereof, will be more fully understood from the following description and drawings.

BRIEF DESCRIPTION OF THE DRAWINGS

Embodiments of the disclosure will now be described with reference to the accompanying drawings in which.

DETAILED DESCRIPTION OF THE PREFERRED EMBODIMENT

Figure 1:
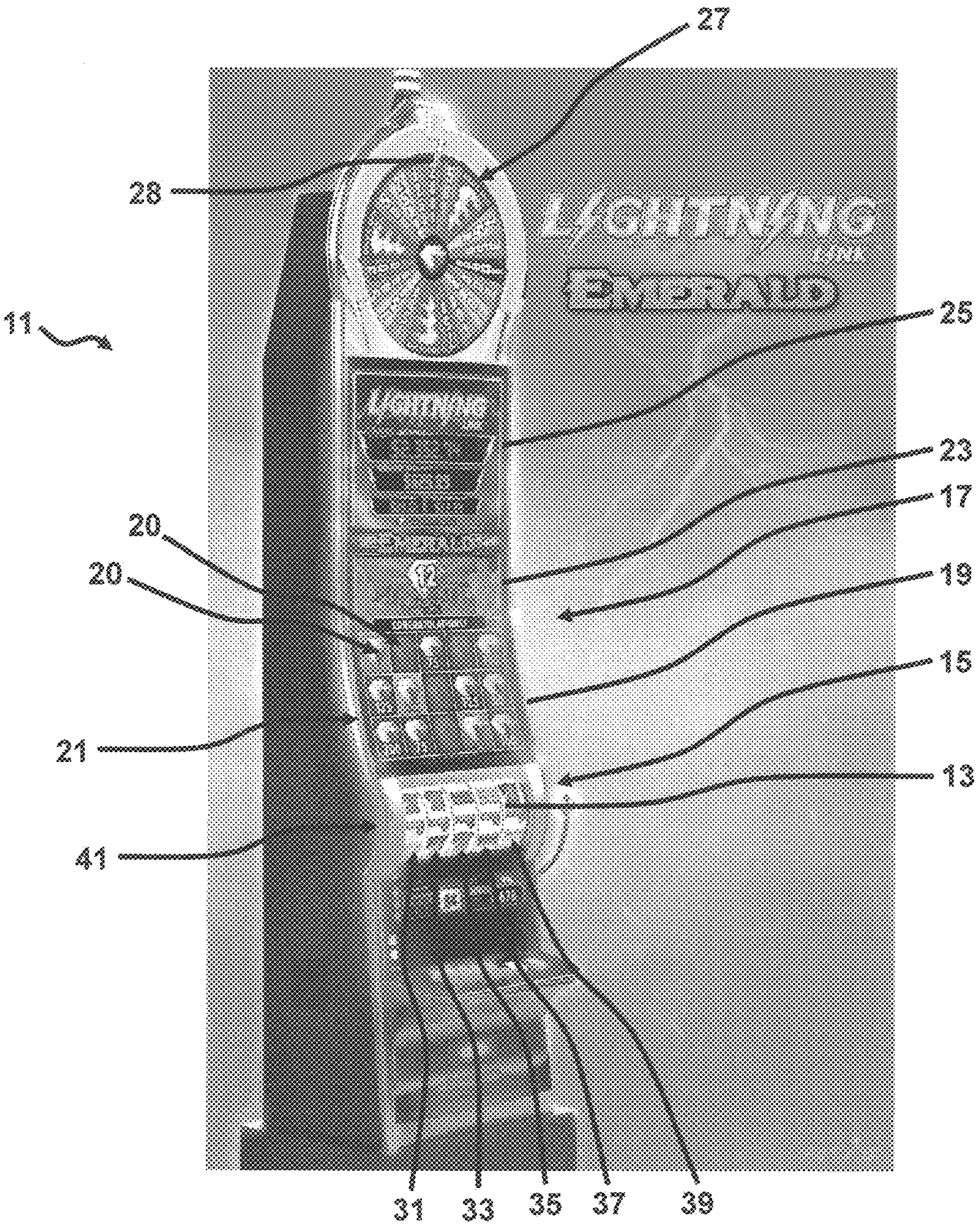
FIG. 1 is a perspective view of a gaming machine, according to the present invention.

Referring to FIG. 1, a gaming system includes a gaming machine 11 for play of a base game, and for play of a spinning reel bonus game, and for play of a rotatable wheel spin game. Gaming machine 11 includes a set of mechanical reels 13 for play of the base game. Reels 13 rotate and stop to provide a reel display 15 of game symbols. Reel display 15 is arranged to provide a 3×5 array of game symbols which form a base game outcome. An award is made to the player in accordance with the base game outcome.

Located above the set of mechanical reels 13 is a video display 17 formed of three separate display areas 19, 23, 25. First display area 19 displays five video reels 20 which rotate and stop to provide a reel display 21 of bonus game symbols. Reel display 21 is arranged to provide a 3×5 array of symbols which forms a bonus game outcome.

Second display area 23 is located above first display area 19, and serves to provide information to the player as to the triggering of the bonus game.

Third display area 25 is located above second display area 23 and serves to display an amount of each of four different progressive jackpots that are separately winnable from play of the bonus game. The four jackpots are identified as a "MINI", "MINOR," "MAJOR" and "GRAND."

A multi-slice rotatable wheel 27 is a mechanical wheel and is located above video display 17.

During play of the base game on mechanical reels 13, a bonus game may be triggered based on the symbol outcome in the mechanical reel display 15. Upon triggering the bonus game, the base game is stopped and no further base game play can occur until the bonus game is completed. The bonus game proceeds with a number of free spins of video reels 20. A bonus award is determined after the free spins have been completed, and the bonus award is then awarded to the player. The award may be made by increasing a credit meter of gaming machine 11.

Also during play of the base game on mechanical reels 13, a wheel spin game may be triggered based on the symbol outcome in the mechanical reel display 15. A wheel spin award is determined and awarded to the player.

General Construction of the Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Figure 2:
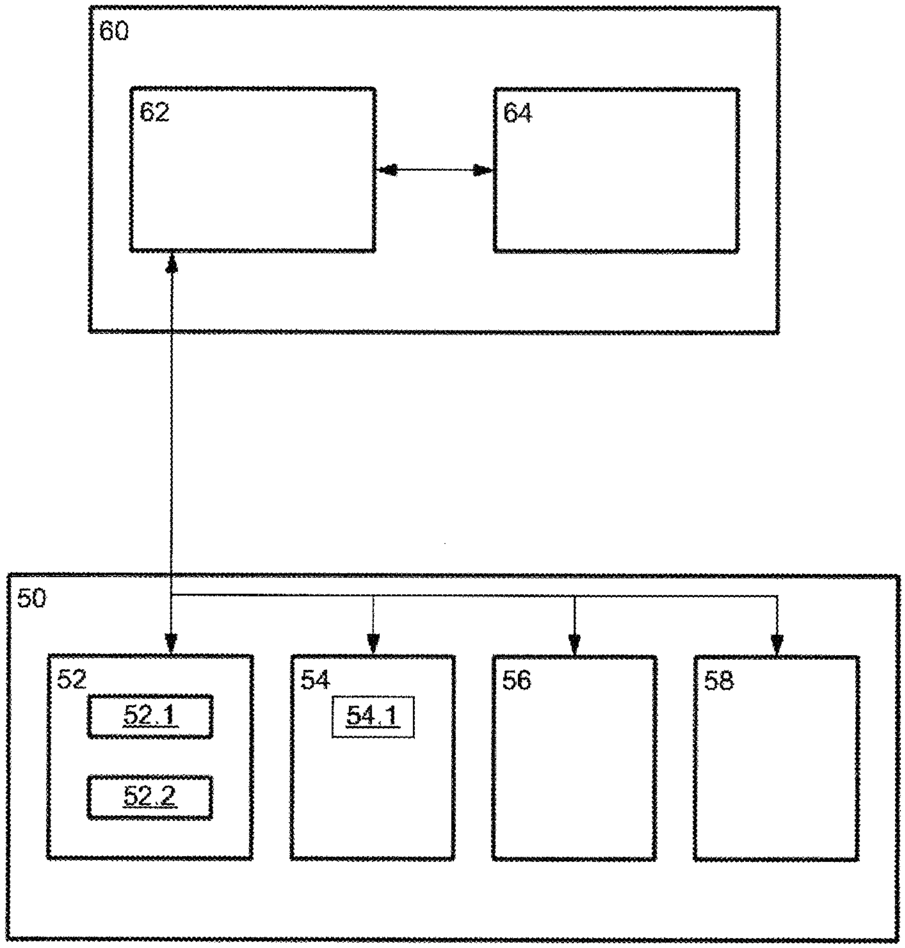
FIG. 2 is a block diagram of the core components of a gaming system.

Referring to FIG. 2, the gaming system has several core components. At the broadest level, the core components are a player interface 50 and a game controller 60. Player interface 50 enables manual interaction between a player and the gaming system, and for this purpose includes input/output components required for the player to enter instructions to play a game and observe game outcomes.

Components of player interface 50 may vary from embodiment to embodiment but will typically include a credit mechanism 52 to enable a player to input credits. For example, in some embodiments, credit mechanism 52 may include a credit input mechanism 52.1 to receive a physical item representing a monetary value for establishing a credit balance. The credit balance may be increasable and decreasable based on wagering activities. In some embodiments, credit mechanism 52 also includes a payout mechanism 52.2 to cause a payout associated with the credit balance. The player interface may also include one or more displays 54, a game play mechanism 56 including one or more input devices that enable a player to input game play instructions (e.g. to place a wager), and one or more speakers 58. In some embodiments, each of the displays 54 includes a plurality of display positions. In other embodiments, each of the display 54 includes a plurality of display areas. Each of the display areas includes a plurality of display positions.

Game controller 60 is in data communication with player interface 50 and typically includes a processor 62 that processes game play instructions in accordance with game play rules and outputs game play outcomes to the display(s) 54. Typically, the game play rules are stored as program code in a memory 64 but can also be hardwired. In some embodiments, memory 54 may also store data indicative of a plurality of symbols, pay tables, images, and other information to be used in games. Herein the term "processor" is used to refer generically to any device that can process game play instructions in accordance with game play rules and may include: a microprocessor, microcontroller, programmable logic device or other computational device, a general purpose computer (e.g. a PC) or a server. That is, a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also known to provide a specific purpose processor using an application specific integrated circuit (ASIC) or a field programmable gate array (FPGA).

Figure 3:
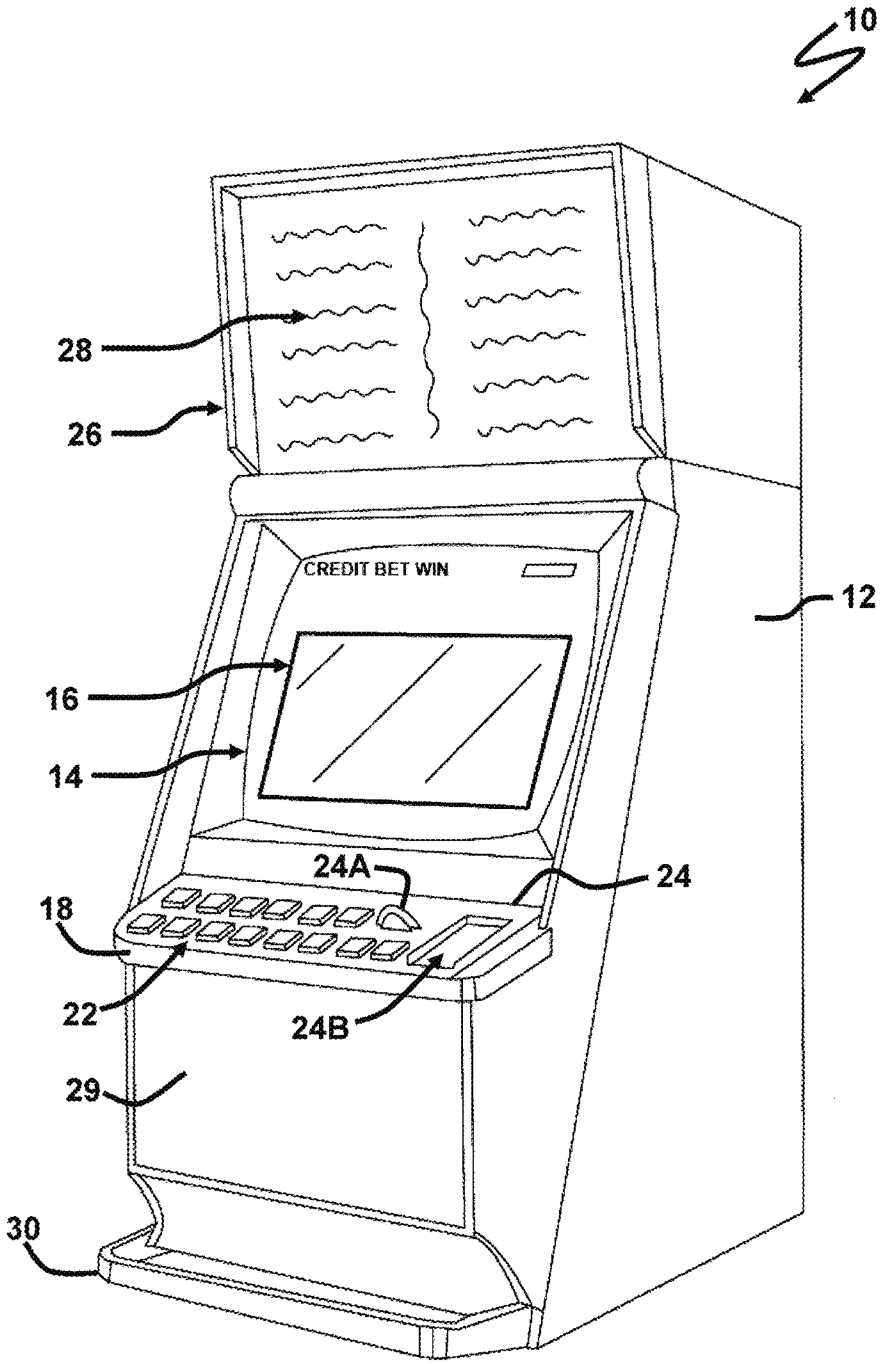
FIG. 3 is a perspective view of a standalone gaming machine.

Referring to FIG. 3, a gaming system in the form of a standalone gaming machine 10 includes a console 12 having a display 14 on which are displayed representations of a game 16 that can be played by a player. A mid-trim 18 of gaming machine 10 houses a bank of buttons 22 for enabling a player to interact with the gaming machine, in particular during game play. Mid-trim 18 also houses a credit input mechanism 24 (similar to credit input mechanism 52.1 of FIG. 2) which in this example includes a coin input chute 24A and a bill collector 24B. Other credit input mechanisms may also be employed, for example, a card reader for reading a smart card, debit card or credit card. Other gaming machines may be configured to accept a ticket such that the credit input mechanism 24 may have a ticket reader (not shown) for reading tickets having a value and crediting the player based on the face value of the ticket. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

As shown in FIG. 3, a top box 26 may carry artwork 28, including for example pay tables and details of bonus awards and other information or images relating to the game. Further artwork and/or information may be provided on a front panel 29 of the console 12.

Gaming machine 10 also includes a payout mechanism having a coin tray 30 that is mounted beneath front panel 29 for dispensing cash payouts from gaming machine 10. Another form of a payout mechanism may include an embedded printer to print out a payout ticket associated with the credit balance that may be redeemed at a cage (not shown).

Display 14 shown in FIG. 3 is in the form of a liquid crystal display. Alternatively, display 14 may be a light emitting diode display, plasma screen, and/or any other suitable video display unit. Top box 26 may also include a display, for example a video display unit, which may be of the same type as display 14, or of a different type.

Figure 4:
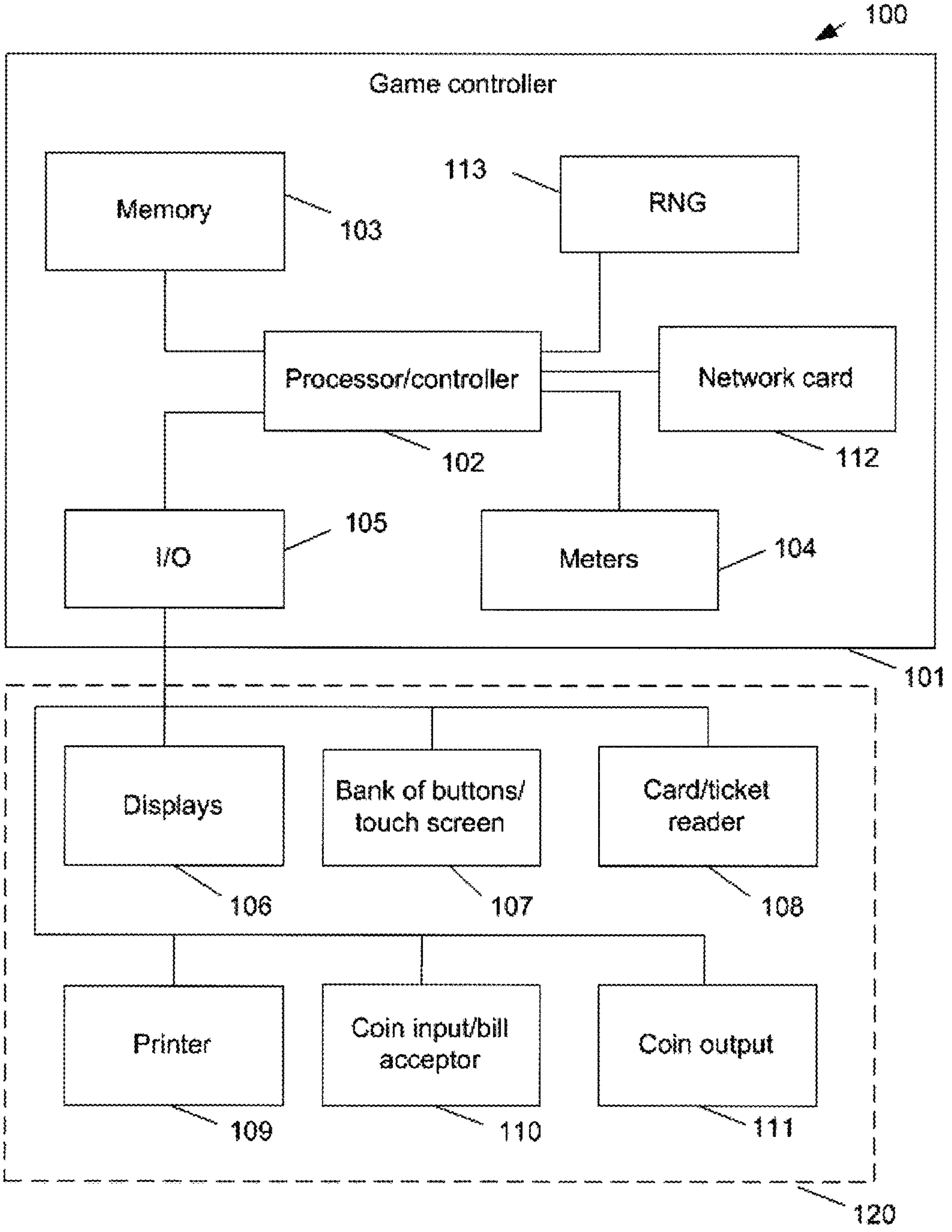
FIG. 4 is a block diagram of the functional components of a gaming machine.

Referring to FIG. 4, a block diagram of operative components of a gaming machine 100 are shown. Gaming machine 100 includes a game controller 101 having a processor 102 mounted on a circuit board. Instructions and data to control operation of processor 102 are stored in a memory 103, which is in data communication with processor 102. Typically, gaming machine 100 will include both volatile and non-volatile memory and more than one of each type of memory, with such memories being collectively represented by memory 103.

Gaming machine 100 has hardware meters 104 for purposes including ensuring regulatory compliance and monitoring player credit, and an input/output (I/O) interface 105 for communicating with peripheral devices of the gaming machine 100. Input/output interface 105 and/or the peripheral devices may be intelligent devices with their own memory for storing associated instructions and data for use with the input/output interface or the peripheral devices. A random number generator module 113 generates random numbers for use by processor 102. Persons skilled in the art will appreciate that the reference to random numbers includes pseudo-random numbers.

In the example shown in FIG. 4, a player interface 120 includes peripheral devices that communicate with game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game, any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, gaming machine 100 may include a communications interface, for example a network card 112. Network card 112 may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 5:
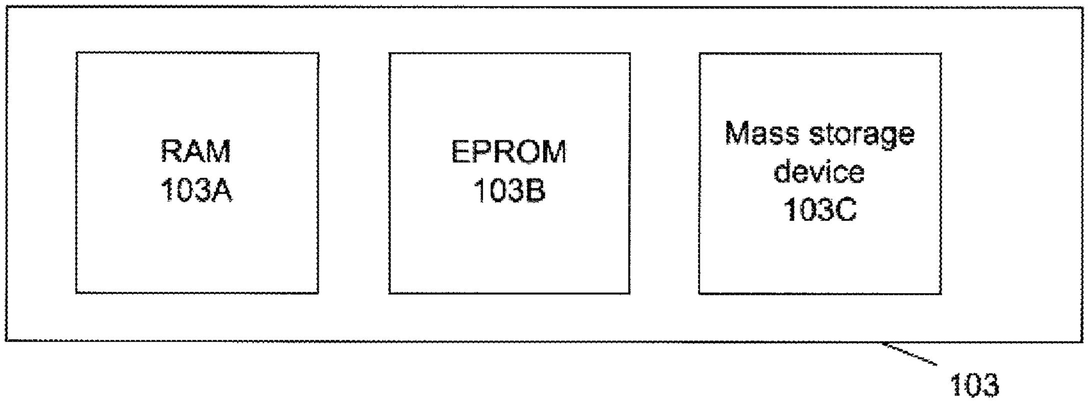
FIG. 5 is a schematic diagram of the functional components of a memory.

Referring now to FIG. 5, the main components of an exemplary memory 103 includes RAM 103A, EPROM 103B and a mass storage device 103C. RAM 103A typically temporarily holds program files for execution by processor 102 (FIG. 4) and related data. EPROM 103B may be a boot ROM device and/or may contain some system or game related code. Mass storage device 103C is typically used to store game programs, the integrity of which may be verified and/or authenticated by the processor 102 using protected code from EPROM 103B or elsewhere.

It is also possible for the operative components of gaming machine 100 to be distributed. For example, input/output devices 106, 107, 108, 109, 110, 111 may be provided remotely from the game controller 101.

Figure 6:
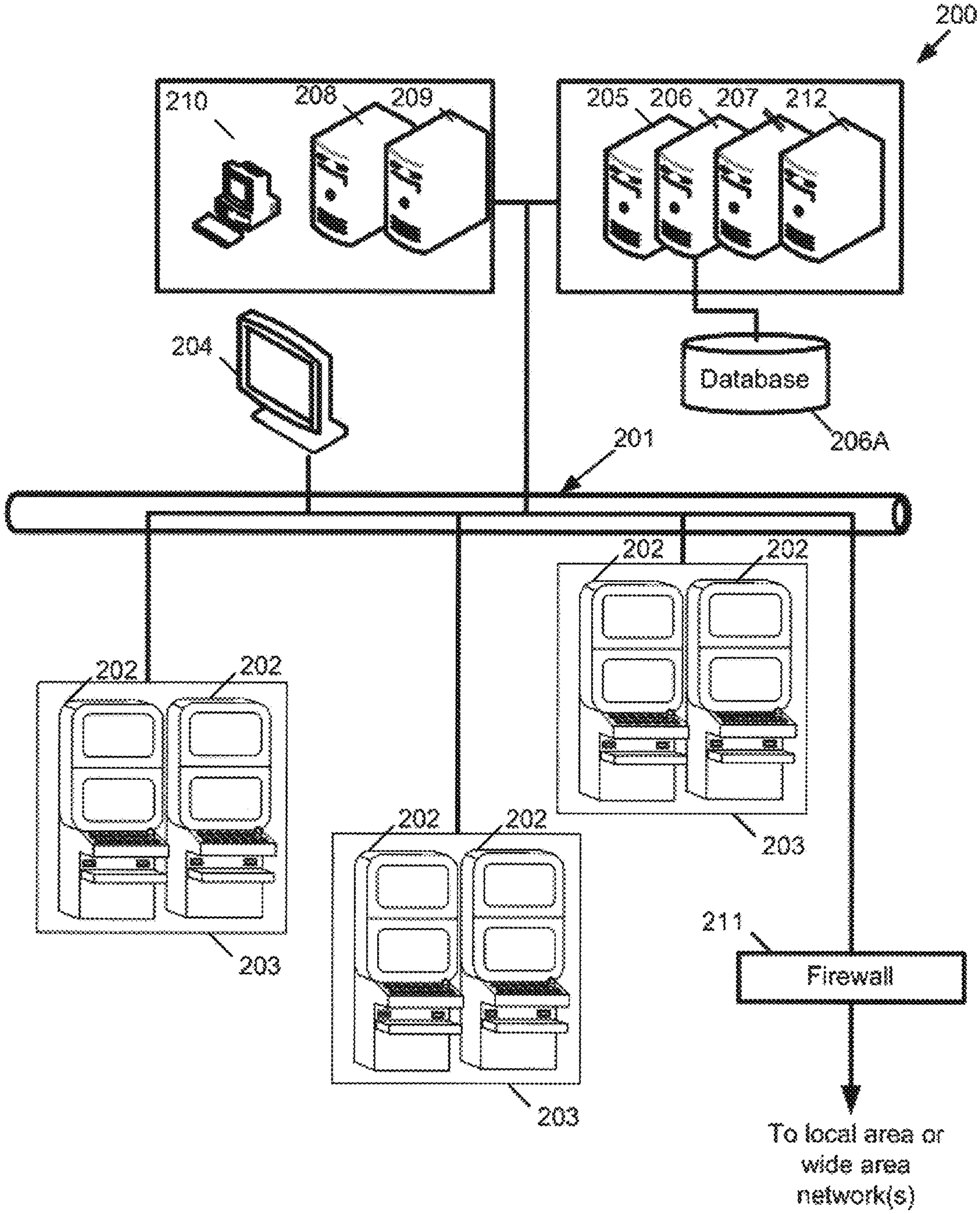
FIG. 6 is a schematic diagram of a network gaming system.

Referring now to FIG. 6, a gaming system 200 includes a network 201, which for example may be an Ethernet network. Gaming machines 202, shown arranged in three banks 203 of two gaming machines 202 are connected to network 201. Gaming machines 202 provide a player operable interface and may be the same as the gaming machines 10, 100 shown in FIGS. 3 and 4, or may have simplified functionality depending on the requirements for implementing game play. While banks 203 of two gaming machines are illustrated in FIG. 5, banks of one, three or more gaming machines are also envisaged.

One or more displays 204 may also be connected to network 201. For example, displays 204 may be associated with one or more banks 203 of gaming machines. Displays 204 may be used to display representations associated with game play on gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run network 201 and the devices connected to the network.

Gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of a Gaming System

Referring again to FIG. 1, gaming machine 11 includes five mechanical reels 31, 33, 35, 37 and 39. Each reel spins separately from the other reels and each reel carries twenty-two symbols. When the five reels stop spinning, three symbols from each reel are displayed to the player, in a 3×5 array 41 to form a base game outcome. An award is determined based on the symbols stopped in array 41.

When six or more trigger symbols (e.g. Diamond symbols) are spun up on the set of mechanical reels 13, the bonus game is triggered. In the bonus game, the six or more Diamond symbols displayed on the mechanical reels are populate up onto first video display area 19.

Figure 7:
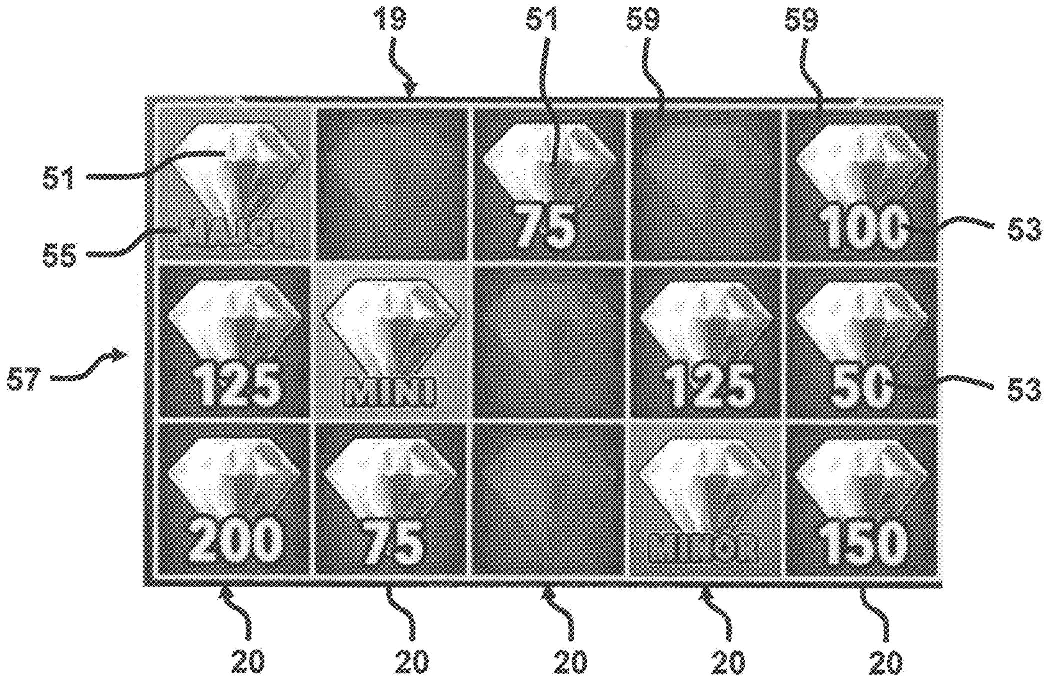
FIG. 7 illustrates a bonus game display of the gaming machine of FIG. 1.

As shown in FIG. 7, first display area 19 of video display 17 includes a number of Diamond symbols 51. Diamond symbols 51 carry a side view of a diamond as well as a visual indication of a prize. The visual indication is shown in terms of a number of credits 53 or in terms of an indication 55 of one of four different jackpots. The four jackpots are identified in indication 55 as either MINI, MINOR, MAJOR or GRAND. The values of the four jackpots are shown in the third display area 25 (FIG. 1) of video display 17.

Each of the six or more Diamond symbols which trigger the bonus game are placed into a different one of the fifteen symbol positions 59 of a 3×5 array 57 at the time the bonus game is triggered. The Diamond symbols are placed in symbol positions 59 corresponding to their symbol positions on the mechanical reels 13 where the Diamond symbols were initially spun up. Diamond symbols 51 in display area 19 are held in place during play of the bonus game.

A number of spins of video reels 20 are given to the player for play of the bonus game. Video reels 20 rotate beneath the held Diamond symbols during the free spins of the bonus game. The mechanical reels 13 do not rotate during the free spins of the bonus game, but are held in place showing the original six or more Diamond symbols that triggered the bonus game.

During the bonus game, three free spins are performed on the five video reels 20 in an attempt to gain more Diamond symbols in the 3×5 array 57, which add more prizes to the player. Video reels 20 of the bonus game include a plurality of symbols as well as Diamond symbols 51. As a new Diamond symbol 51 is displayed in array 57 during a free spin, that new Diamond symbol is held in place for any remaining free spins of reels 20. The number of free spins may be increased, for example, by providing another three spins every time a new Diamond symbol comes up onto the 3×5 array 57. Thus, up to fifteen Diamond symbols 51 may be spun up and held in place in the 3×5 symbol array 57.

Upon completion of the final spin of reels 20, a bonus award is made to the player based on credits 53 and jackpot indications 55 identified on each of the Diamond symbols that spun up. No bonus award occurs based on the particular combination (or payline combination) of symbols in array 57. After final spin of reels 20, return is then made to the play of the base game on mechanical reels 13.

Figure 8:
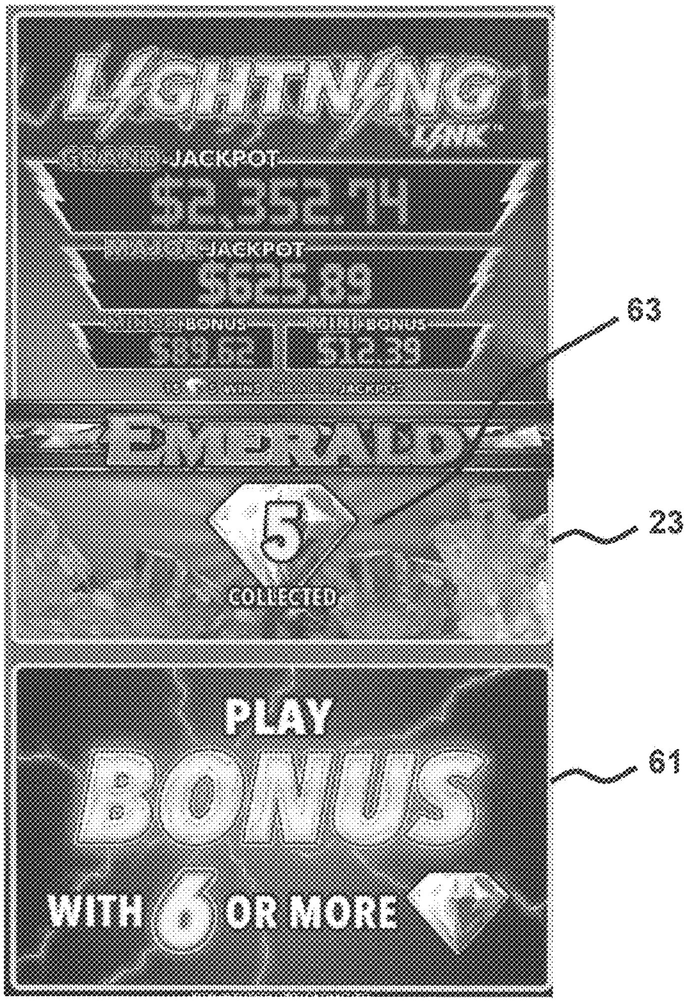
FIG. 8 illustrates a video display of the gaming machine of FIG. 1.

Referring to FIG. 8, during base game play on the set of mechanical reels 13, (and prior to the start of the base game play) a message 61 is displayed in the first video display area 19 to tell the player how many Diamond symbols are needed to be spun up on the mechanical reels to trigger the play of the bonus game. In addition, second video display area 23 provides a message 63 to tell the player the number of Diamond symbols that are presently spun up on the mechanical reels. As shown in FIG. 8, message 63 tells the player that five Diamond symbols were spun up in the recent base game spin.

Alternative to message 61 being displayed during base game play, 3×5 array 57 may be displayed in video display area 57 with less than six Diamond symbols placed in 3×5 array 57 in symbol positions corresponding to the Diamond symbol positions on the mechanical reels. Thus, if only four Diamond symbols are spun up on the mechanical reels, four Diamond symbols are shown in the 3×5 array 57 on the first video screen. Message 63 would also tell the player that four Diamond symbols were spun up.

Figure 9:
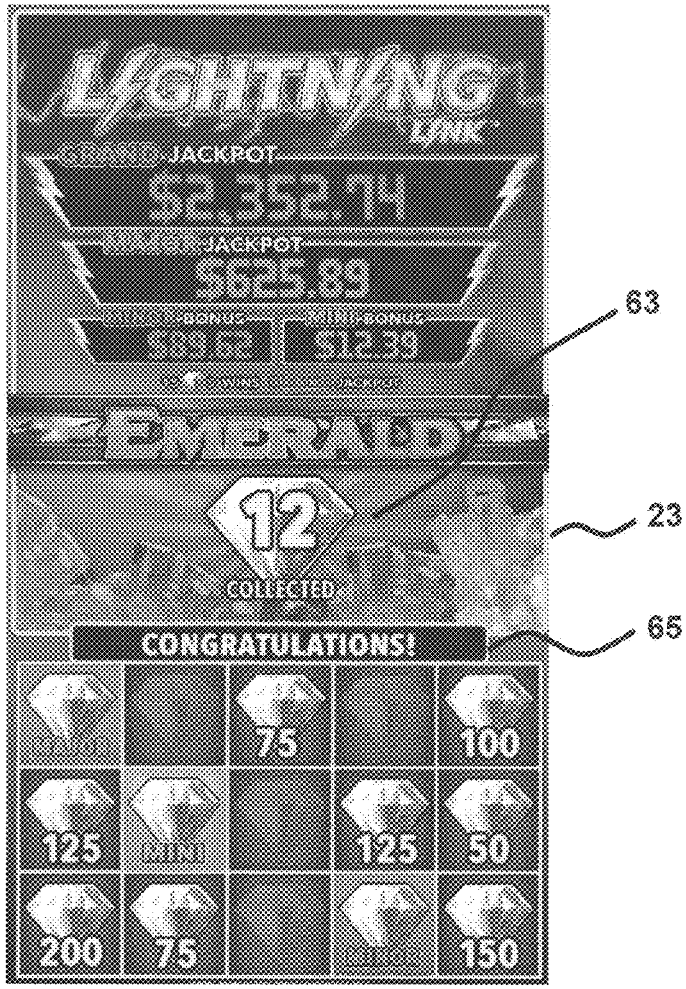
FIG. 9 illustrates a video display of the gaming machine of FIG. 1.

Referring to FIG. 9, when six or more Diamond symbols are spun up and then populated onto the first video display area 19 into positions corresponding to their mechanical reel positions, second video display area 23 displays a message 63 of the number of Diamond symbols collected. Second video display area 23 changes its displayed collected value in message 63 as new Diamond symbols are spun up during free spins of the bonus game. As shown in FIG. 9, a win indicator 65 with the word "CONGRATULATIONS" may be displayed between the first and second video display areas to further player enjoyment.

Figure 10:
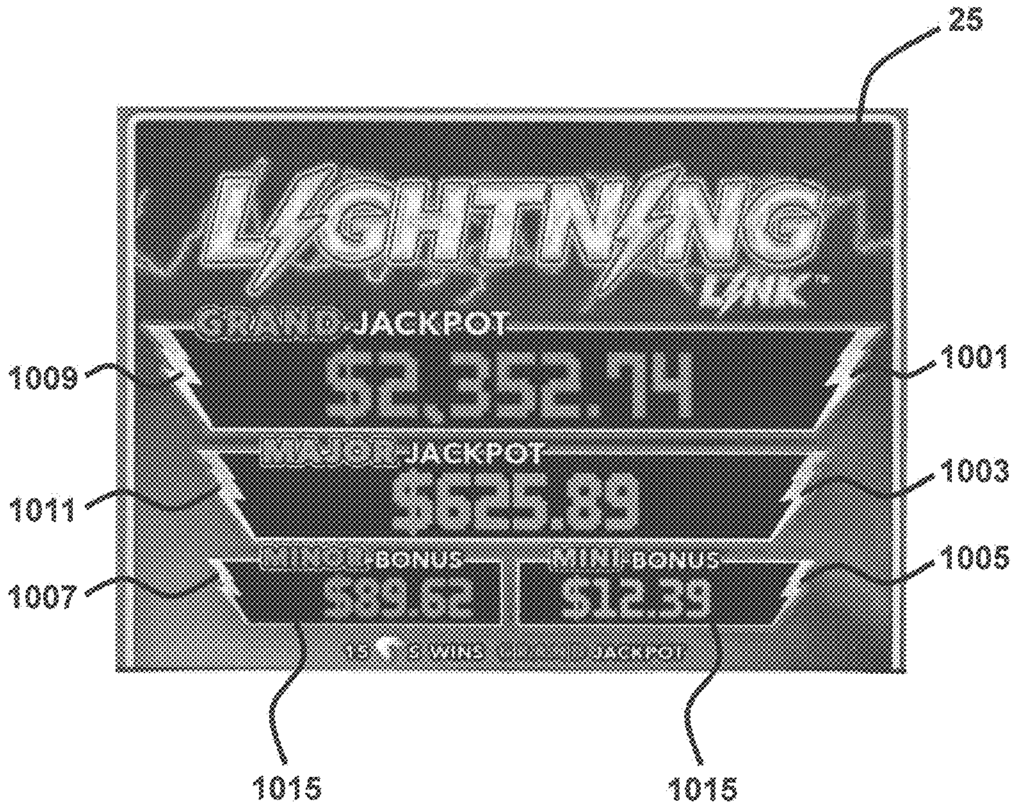
FIG. 10 illustrates the upper portion of the video display of FIG. 9.

Third video display area 25, as shown more particularly in FIG. 10, is located above second video display area 23. Third display area 25 has four separate boxed areas 1001, 1003, 1005, 1007. Each boxed area has an indicator 1009, 1011, 1013, 1015 identifying a jackpot bonus by name e.g., MINI. MINOR, MAJOR and GRAND. Within the boxed area is placed a dollar amount representing the value of the associated jackpot prize if won in the bonus game. For example, a win of the GRAND jackpot results in $2,352.74. The dollar amounts within boxed areas 1001-1007 may be frozen (no further progressing in value) at the point when the bonus game is played, or alternatively at the point when the particular jackpot is won by a Diamond symbol spun up in the bonus game and bearing the particular jackpot name.

Further, each indicator name, e.g., MINI, is displayed in a color different than the color of the other three jackpot names. The word "MINI" is colored orange. The prize amount is also displayed in the same color as the color of the jackpot name. The MINI prize of $12.39 is colored orange.

Figure 11:
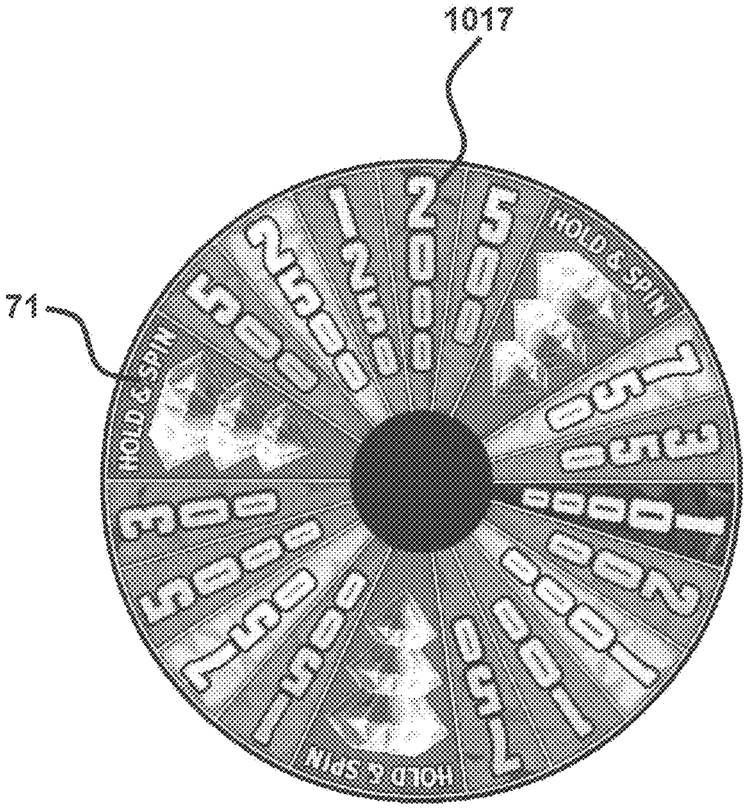
FIG. 11 illustrates a mechanical wheel game display of the gaming machine of FIG. 1.

Referring to FIG. 11, rotatable wheel 27 may be located above the third video display area, as shown in FIG. 1. Wheel 27 is a mechanical wheel which is rotatable relative to a pointer 28 shown in FIG. 1 at the top of wheel 27. Upon stopping of the spinning of wheel 27, pointer 28 identifies one of nineteen wheel slices. A number on a slice, e.g. the number 2000 identified by reference number 1017, represents a number of credits to be awarded as a prize. That is, reference number 1017 in FIG. 11 identifies the number "2000" for an award of 2000 credits.

Wheel 27 is triggered to be spun based on particular symbols appearing in the mechanical reels during play of the base game. For example, a special WHEEL SPIN symbol may appear in the base game and trigger spin of wheel 27. A random number may be used to determine the stopping position of wheel 27.

One outcome of the spin of wheel 27 is shown at wheel slice 71 which triggers the play of the bonus game from the wheel spin game. If slice 71 is obtained, six Diamond symbols are populated randomly in the first video display area 19, in array 57. The bonus game is then played with the free spins as described above.

Figure 12:
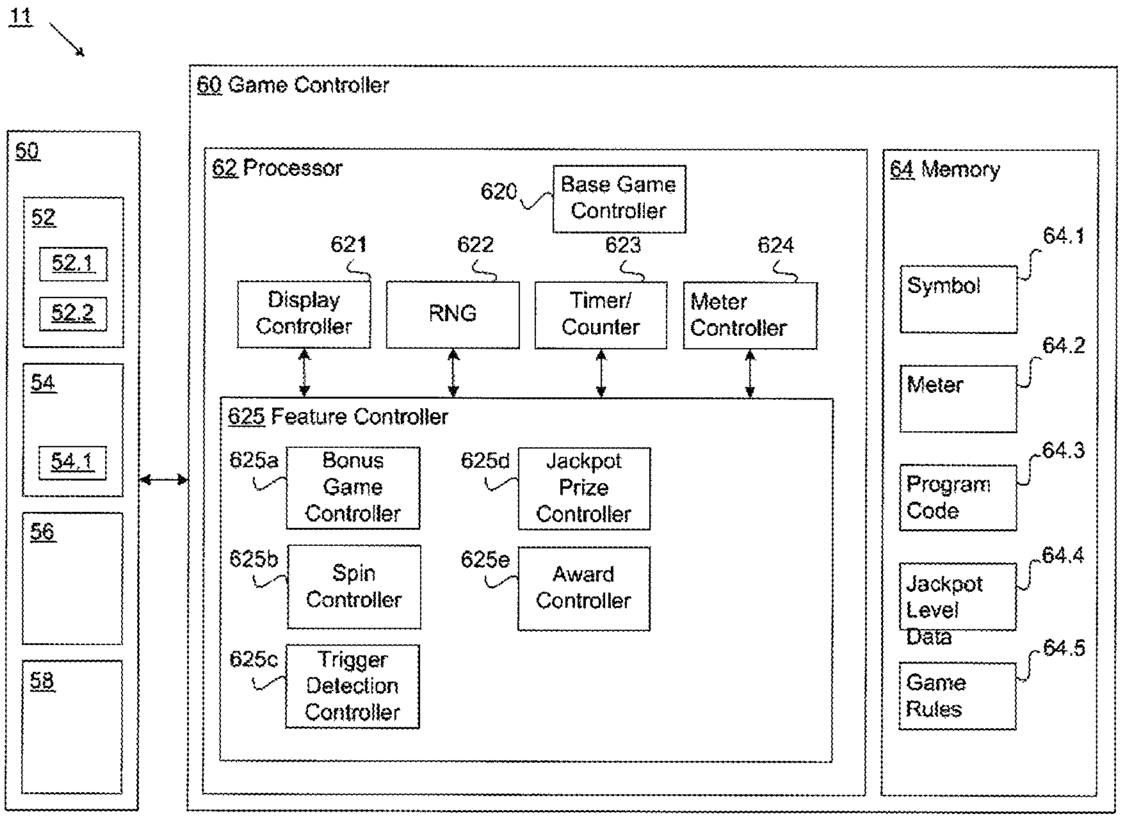
FIG. 12 illustrates a block diagram of the gaming machine of FIG. 1.

Referring to FIG. 12, gaming machine 11 includes a game controller 60 that further includes a processor 62 and a memory 64. Memory 64 includes a symbol memory module 64.1 that stores data of a plurality of symbols, a meter memory module 64.2 that stores meter data of gaming machine 11, and a program code memory 64.3 that stores program code to implement a number of modules to be executed by processor 62. In the embodiment shown, memory 64 also stores jackpot level data that specifies a plurality of jackpot prizes for a plurality of jackpot levels, respectively, in a jackpot level data memory module 64.4. In the embodiment shown, the memory 64 also stores a plurality of game rules in a game rule memory module 64.5.

Persons skilled in the art will appreciate that some or all of the components of game controller 60 could be alternatively implemented. For example, in some embodiments, game controller 60 and its components are implemented in the form of a dedicated circuit, or an individual application-specific-integrated-circuit (ASIC). In other embodiments, each of game controller 60 and its components is implemented as an individual ASIC. In other embodiments, some or all of game controller 60 and its components may be individually or collectively implemented as software modules, controllers, and/or circuitries.

In the embodiment shown, processor 62 includes a display controller 621 to control display 54, a random number generator (RNG) 622 to generate random numbers, and a timer/counter 623 to count, for example, a number of free spins in the bonus game.

Processor 62 also may include a meter controller 624 to generate meter data, for example, for display or storage based on game play, and/or to read meter data from the meter memory 64.2.

Processor 62 also includes a base game controller 620 to control rotation and stopping of the five mechanical reels 31-39. Base game controller 620 communicates with RNG 622 for play of the base game. A random number selected from RNG 622 to control the stopping position of each reel 31-39. Once reels 31-39 are stopped, the fifteen symbols displayed in the 3×5 array 41 are analyzed for determining an award. In addition, the symbols are inspected as to whether six or more Diamond symbols are spun up in the base game outcome. If six or more Diamond symbols are spun up, a trigger is generated to initiate play of the bonus game. In addition, base game controller 620 determines whether a SPIN-WHEEL symbol has occurred in the base game output. If so, then a trigger is generated to initiate play of the Wheel-Spin game.

Processor 62 also includes a feature controller 625 that manages how a feature game is played, for example, how the bonus game or how the wheel game is played. Feature controller 625 communicates with display controller 621, RNG 622, and timer/counter 623 for play of the bonus game, and communicates with display controller 621 and RNG 622 for play of the spin of wheel 27.

In the embodiment shown, feature controller 625 includes a bonus game controller **625*a* which manages play of the bonus game once triggered, including initial populating of diamond symbols onto video display 17, providing a number of free spins of video reels 20, with symbols displayed on the 3×5 bonus array 57, as well as displaying symbol collected information in second display area 23. Where three free spins of video reels 20 are awarded, timer/counter 623** counts the free spins. The count of the free spins may be increased, as described above, to add more free spins during the play of the bonus game.

Bonus reels 20 may be spun in a conventional fashion by selecting symbols from symbol memory 64.1. For example, a reel stop of a video reel may be randomly selected to provide three symbols in the bonus outcome array. Alternatively, three selections of symbols in symbol memory 64 may be performed for each reel and then the three selected symbols of each reel is displayed in the array.

Feature controller 625 also includes a spin controller **625*b* which controls rotation of wheel 27 to spin and then stop wheel 27. A random stop position of wheel 27 may be selected and then the wheel spun and stopped. Also, when wheel 27 lands on spin slice 71, bonus game controller 625*a* causes six Diamond symbols to be randomly located in the display positions on video area 19** and play of the bonus game commences.

A trigger detection controller **625*c* determines if the bonus game and/or the spin of wheel 27 is triggered during the play of the base game. Six or more Diamond symbols appearing in the base game outcome is detected by trigger detection controller 625*c*. A wheel spin trigger formed from a wheel spin scatter symbol appearing in the base game is detected by trigger detection controller 625*c* and a free spin of wheel 27 is initiated. In some embodiments, both the bonus game and the spin of wheel 27 cannot be triggered at the same time i.e., based on the same base game outcome. In other embodiments, the six Diamond symbols and the wheel spin scatter symbol may be shown simultaneously or sucessively. As will suggest itself, a wheel spin scatter symbol may be one of the symbols selectable in the bonus game, causing a free spin of wheel 27. In addition, trigger detection controller 625*c* may be used to determine whether wheel 27 (FIG. 1) has landed on a hold and spin slice 71 (FIG. 12**), and if so, the bonus game is triggered.

Feature controller 625 also includes a jackpot prize controller **625*d* which manages how wagers placed by a player progressively contribute to the four multi-level progressive prizes. In some embodiments, the jackpot prizes are capped. Jackpot controller 625 causes display of the values of each jackpot in boxed areas 1001-1007 (FIG. 10**), as described above.

Feature controller 625 also includes an award controller **625*e* which controls the award of the bonus game prize in accord with the prizes identified on the Diamond symbols that are present at the end of the free spins of the bonus game. The prizes identified on a Diamond symbol may be stored in symbol memory 64.1 in association with the particular Diamond symbol. Award controller 625*e*** also controls the award of the wheel game prize.

When credit input mechanism 52.1 receives a physical item representing a monetary value for establishing a credit balance, the player may use game play mechanism 56 (e.g., a spin button, not shown) which causes game controller 60 to initiate a base game.

Figure 13:
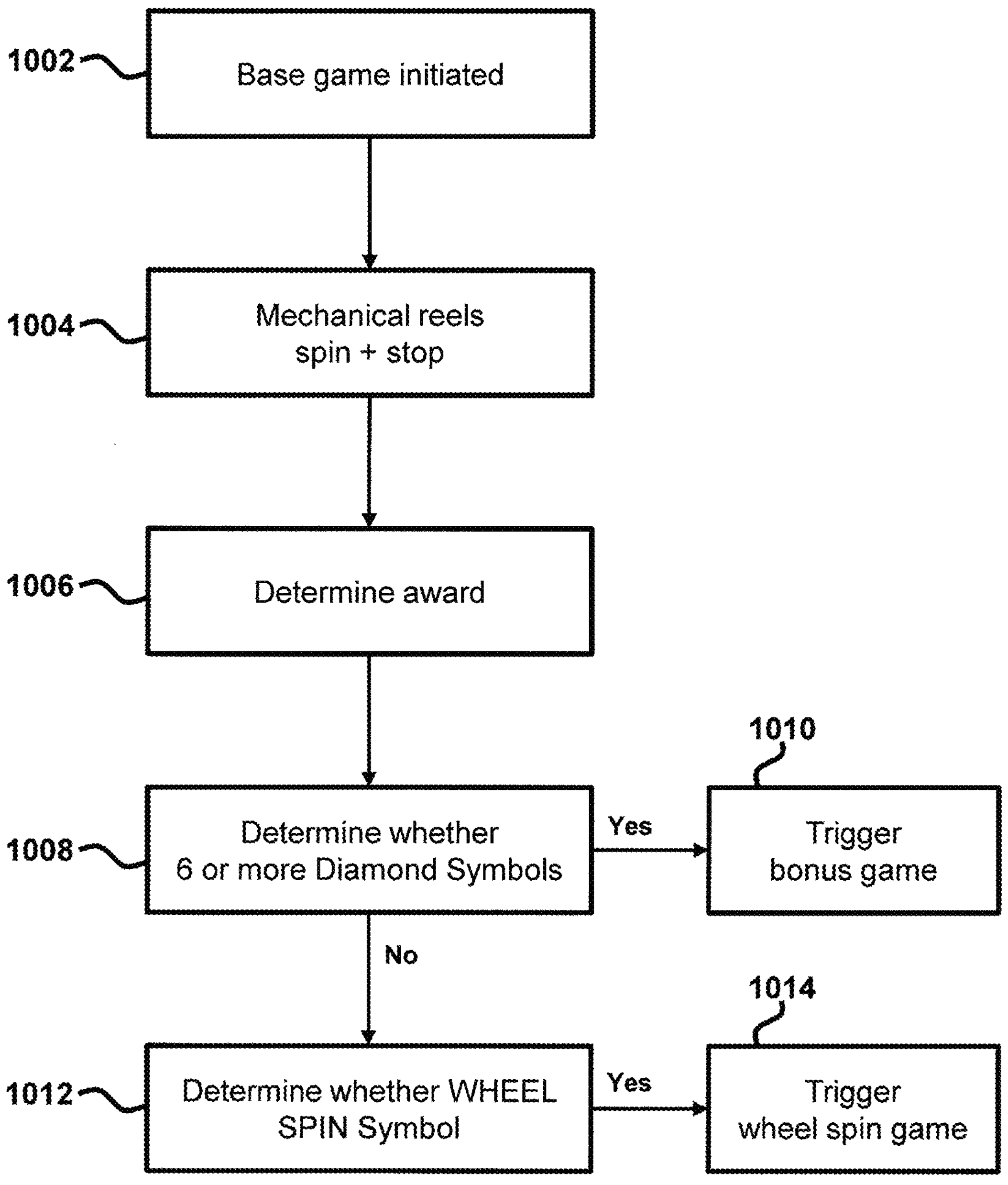
FIG. 13 illustrates a flow chart of an exemplary game process of the gaming machine of FIG. 1.

FIG. 13 illustrates a flow chart of an exemplary game process 1000. At block 1002, the base game is initiated by the player. In some embodiments, when credit input mechanism 52.1 (FIG. 2; FIG. 12) receives a physical item representing a monetary value for establishing a credit balance, the player makes a wager from the credit balance and activates play of the base game.

After initiation of the base game, the mechanical reels spin, at block 1004. Base game controller 620 selects reel stop positions for the five mechanical reels 31-39 via RNG 622. Base game controller 620 spins the five reels 31-39 and stops the five reels at the selected reel stop positions to display the 3×5 array for game symbols.

At block 1006, awards are determined based on the symbol outcome shown in the 3×5 array of reels 31-39.

At block 1008, trigger detection controller **625*c* determines whether six or more Diamond symbols are spun up in the base game outcome. If trigger detection controller 625*c* determines such, the bonus game is triggered at block 1010. If not, at block 1012, trigger detection controller 625*c* determines whether a WHEEL SPIN symbol is spun up in the base game outcome. If the trigger detection controller 625*c* determines such, the wheel spin game is triggered at block 1014**.

If no bonus game or wheel spin game is triggered, the player may continue to play the base game.

As described above, an embodiment may include spinning up both six Diamond symbols and a WHEEL-SPIN symbol. If so, then both blocks 1008 and 1012 are combined, followed by both blocks 1010 and 1014.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

Further aspects of the method and apparatus of the embodiment will be apparent from the above description of the system. It will be appreciated that at least part of the embodiment will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the embodiment may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It will be understood to persons skilled in the art of the invention that many modifications may be made without departing from the spirit and scope of the invention. In particular, it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A gaming machine, comprising:

one or more display devices; and a game controller executing instructions stored in a memory, wherein execution of the instructions causes the game controller to:

present a first symbol outcome in a first plurality of display positions of the one or more display devices; and in response to the first symbol outcome comprising at least a threshold quantity of a first symbol, populate a second quantity of a second symbol in display positions of a second plurality of display positions that are distinct from the first plurality of display positions such that (a) the second quantity of the second symbol equals a first quantity of the first symbol in the first plurality of display positions and (b) a relative position of each second symbol in the second plurality of display positions matches a relative position of a corresponding first symbol in the first plurality of display positions.

2. The gaming machine of claim 1, wherein execution of the instructions causes the game controller to allocate a first quantity of updates of the second plurality of display positions.

3. The gaming machine of claim 2, wherein execution of the instructions causes the game controller to lock each instance of the second symbol at its respective display position in the second plurality of display positions for the first quantity of updates.

4. The gaming machine of claim 2, wherein execution of the instructions causes the game controller to allocate an additional second quantity of updates of the second plurality of display positions in response to an update of the second plurality of display positions adding an instance of the second symbol to at least one display position of the second plurality of display positions.

5. The gaming machine of claim 4, wherein execution of the instructions causes the game controller to lock each instance of the second symbol at its respective display position in the second plurality of display positions until completion of the additional second quantity of updates.

6. A method of a gaming machine, the method comprising:

presenting a symbol outcome for a first game by spinning first reels of the gaming machine;

in response to the symbol outcome for the first game comprising at least a threshold quantity of a first symbol:

initiating a second game;

populating display positions associated with second reels of the gaming machine with a quantity of a second symbol, wherein the second reels are distinct from the first reels, wherein the quantity of the second symbol equals a quantity of the first symbol in the symbol outcome, and wherein a relative position of each second symbol in the display positions associated with the second reels matches a relative position of a corresponding first symbol in the symbol outcome; and spinning one or more of the second reels to update display positions that do not display the second symbol.

7. The method of claim 6, comprising allocating to the second game a first quantity of spins of the second reels.

8. The method of claim 7, comprising retaining each instance of the second symbol at its respective display position for the first quantity of spins of the second reels.

9. The method of claim 7, comprising allocating an additional second quantity of spins of the second reels to the second game in response to a spin of one of more of the second reels adding an instance of the second symbol to at least one display position.

10. The method of claim 9, comprising retaining each instance of the second symbol at its respective display position for at least a duration of the second game.

11. A non-transitory computer readable medium comprising instructions, which when executed, cause a gaming machine to at least:

present symbols at first display positions;

in response to the symbols at the first display positions comprising at least a threshold quantity of a first symbol, present a quantity of a special symbol at second display positions that are distinct from the first display positions such that (a) the quantity of the special symbol at the second display positions equals a quantity of the first symbol at the first display positions and (b) a relative position of each special symbol at the second display positions matches a relative position of a corresponding first symbol at the first display positions; and update display positions of the second display positions that do not present an instance of the special symbol.

12. The non-transitory computer readable medium of claim 11, wherein the instructions, when executed, cause the gaming machine to allocate a first quantity of updates of the second display positions.

13. The non-transitory computer readable medium of claim 12, wherein the instructions, when executed, cause the gaming machine to retain each instance of the special symbol at its respective display position in the second display positions for the first quantity of updates of the second display positions.

14. The non-transitory computer readable medium of claim 12, wherein the instructions, when executed, cause the gaming machine to allocate an additional second quantity of updates of the second display positions in response to an update of the second display positions adding an instance of the special symbol to at least one display position of the second display positions.

15. The non-transitory computer readable medium of claim 14, wherein the instructions, when executed, cause the gaming machine to retain each instance of the special symbol at its respective display position in the second display positions for the first quantity of updates and the additional second quantity of updates of the second display positions.

* * * * *